Aug. 14, 1962 W. R. JOHNSON 3,049,595

TRANSDUCING SYSTEM

Filed March 9, 1959 3 Sheets-Sheet 1

INVENTOR:
Wayne R. Johnson
By Smyth & Roston
Attorneys

Aug. 14, 1962 W. R. JOHNSON 3,049,595

TRANSDUCING SYSTEM

Filed March 9, 1959 3 Sheets-Sheet 2

INVENTOR:
Wayne R. Johnson

By Smyth & Roston
Attorneys

INVENTOR:
Wayne R. Johnson
By Smyth & Roston
Attorneys

United States Patent Office 3,049,595
Patented Aug. 14, 1962

3,049,595
TRANSDUCING SYSTEM
Wayne R. Johnson, Los Angeles, Calif., assignor to Minnesota Mining and Manufacturing Company, St. Paul, Minn., a corporation of Delaware
Filed Mar. 9, 1959, Ser. No. 798,207
13 Claims. (Cl. 179—100.2)

This invention relates to apparatus for reproducing signals recorded on a multitrack recording medium and, more particularly, to reproducing apparatus for reducing cross-talk between adjacent tracks or channels on a multitrack recording medium.

In my patent application, Serial No. 733,165, filed on May 5, 1958, there is disclosed a traveling wave transducer head for transversely recording wide band signals on successive transverse tracks of a longitudinally moving magnetic tape. By transversely recording on the magnetic tape, the longitudinal movement of the tape may be materially reduced without reducing the reproducible band width or attenuating the higher frequencies of the side band signals.

The transducer head is stationary and has a tubular shape which extends transversely across the tape and past which the tape is longitudinally moved. Transverse recording and reproducing is achieved even though the transducer head is stationary by exciting in the head longitudinal elastic waves which move transversely with respect to the magnetic tape. The transducer head includes a tube which is magnetostrictive and the elastic waves momentarily relieve stresses normally in the tube so that, in effect, the elastic waves function as enabling waves by locally changing the permeability of the tube. A signal coil is coupled to the tube for introducing frequency modulated signals to be recorded and for receiving reproducing frequency modulated signals from the magnetic tape.

In order to accurately reproduce recorded signals, it is desirable that the tape speed and position be accurately coordinated with the repetition rate of the excited elastic waves in the head. Even though the tape is being advanced at the proper speed, an uncoordinated elastic wave may travel down the transducer head tube at a point between two transverse tracks, reproducing information from both tracks.

The distortion or interference due to reproducing information from adjacent tracks is referred to as cross-talk. Cross-talk occurs when the path of an elastic wave does not coincide with the imaginary centerline of the transverse track being reproduced. If the elastic waves are not accurately coordinated with respect to the movement of the tape or if any angular variation in the positions of the magnetic tape relative to the transducer head exists, cross-talk from adjacent tracks may be present. Angular variations in the positions of the magnetic tape relative to the transducer head are generally designated as "skew." Cross-talk may occur due to skew because the path of the elastic wave is then at an angle to the centerline of the transverse track on the tape. When the elastic wave path is furthest from the centerline, which is when it is closest to an adjacent track, the possibility of reproducing information from the adjacent track is greatest.

Since the dimensions of the tracks are quite small, minute variations in either coordination or skew may result in cross-talk. The width of a transverse track, for example, may be of 0.1 mil and the spacing between centerlines of adjacent tracks may be 0.2 mil. Moreover, even if the coordination between the elastic pulses and tape movement is completely accurate and skew is absent when the tape is being reproduced, any lack of coordination or skew when the tape was recorded will result in cross-talk. Cross-talk may also occur because the recording level exceeds a predetermined value so that the width of the transverse tracks becomes effectively somewhat greater than 0.1 mil. The amount of cross-talk which may be considered as noise or unwanted signals from adjacent tracks, is therefore, dependent upon the accuracy of the coordination and skew for both recording and reproducing sequences and the recording level. Some cross-talk is usually present.

In one specific embodiment of this invention, cross-talk between adjacent tracks is reduced by subtracting signals derived from adjacent tracks representative of the average cross-talk and by adjusting the repetition rate of the elastic waves in the traveling wave transducer head to coordinate the transverse elastic waves with the tape movement. The elastic waves in the transducer head are generated by a piezoelectric crystal which is periodically excited by pulses supplied from a constant frequency pulse source to the crystal through a variable delay circuit. The delay provided by the variable delay circuit for the pulses is dependent upon an error signal which is developed from the reproduced signals. The reproduced signals may be frequency-modulated signals where the modulating signals are color television chrominance signals or the like wherein the information is indicated by the phase displacement of information signals from bursts of reference oscillations. The color hues of the received color television picture depend upon the phase displacement between the information signals and the reference oscillations.

The reproduced signals from the transducer head are supplied to delay means having a delay period equal to the transit time for reproducing one transverse track on the magnetic tape. Two cross-talk reducing signals are subtracted from the delayed reproduced signals from the delay means: one derived from the next preceding track; and one derived from the next succeeding track. By delaying the reproduced signals for the reproduction or transit time of one track, the delayed signals are supplied from the delay means at the same time that signals are being reproduced from the next succeeding transverse track. The reproduced signals from the succeeding track are attenuated to the average cross-talk level and the attenuated signals are subtracted from the delayed signals.

Signals from the next preceding transverse track are derived by additionally delaying the delayed signals for another interval equal to the reproduction time of one track. The additionally or doubly delayed signals which are derived from the next preceding track are also attenuated to the average cross-talk level and subtracted together with the signals from the next succeeding track from the singly delayed signals. The resulting signal, delayed by the reproduction time of one transverse track, has cross-talk from adjacent tracks effectively eliminated.

In order to coordinate the elastic waves in the head with the tape movement and reduce the cross-talk in the reproduced signals, the bursts of reference oscillation of the delayed signals are separated from the information signals of the delayed signals. The phase of the separated bursts of reference oscillation is compared with the phase of a signal from a reference source of frequency in a phase detector or comparator. The signal from the reference source has the same nominal frequency as the sub-carrier frequency which is utilized for the bursts of reference oscillation in the chrominance signal. The phase comparator generates an error signal having a magnitude and polarity related to the magnitude and direction of the phase deviation of the bursts of reference oscillation with respect to the phase of the signal from the reference source. The error signal from the comparator is supplied to the variable delay circuit to adjust the delay provided by the variable delay circuit for the pulses from the pulse source to the crystal in the transducer head.

By changing the delay provided by the variable delay circuit, the repetition rate of the elastic waves is adjusted to adjust their coordination relative to the movement of the tape. In this manner, any change in speed or transverse movement of the tape during the recording and reproducing sequences which tends to reduce to the coordination and thereby increase cross-talk is compensated for by adjusting the repetition rate of the elastic pulses in the transducer head.

Further features and advantages of this invention will become apparent upon consideration of the following description taken in conjunction with the drawing wherein.

Figures 5, 6:
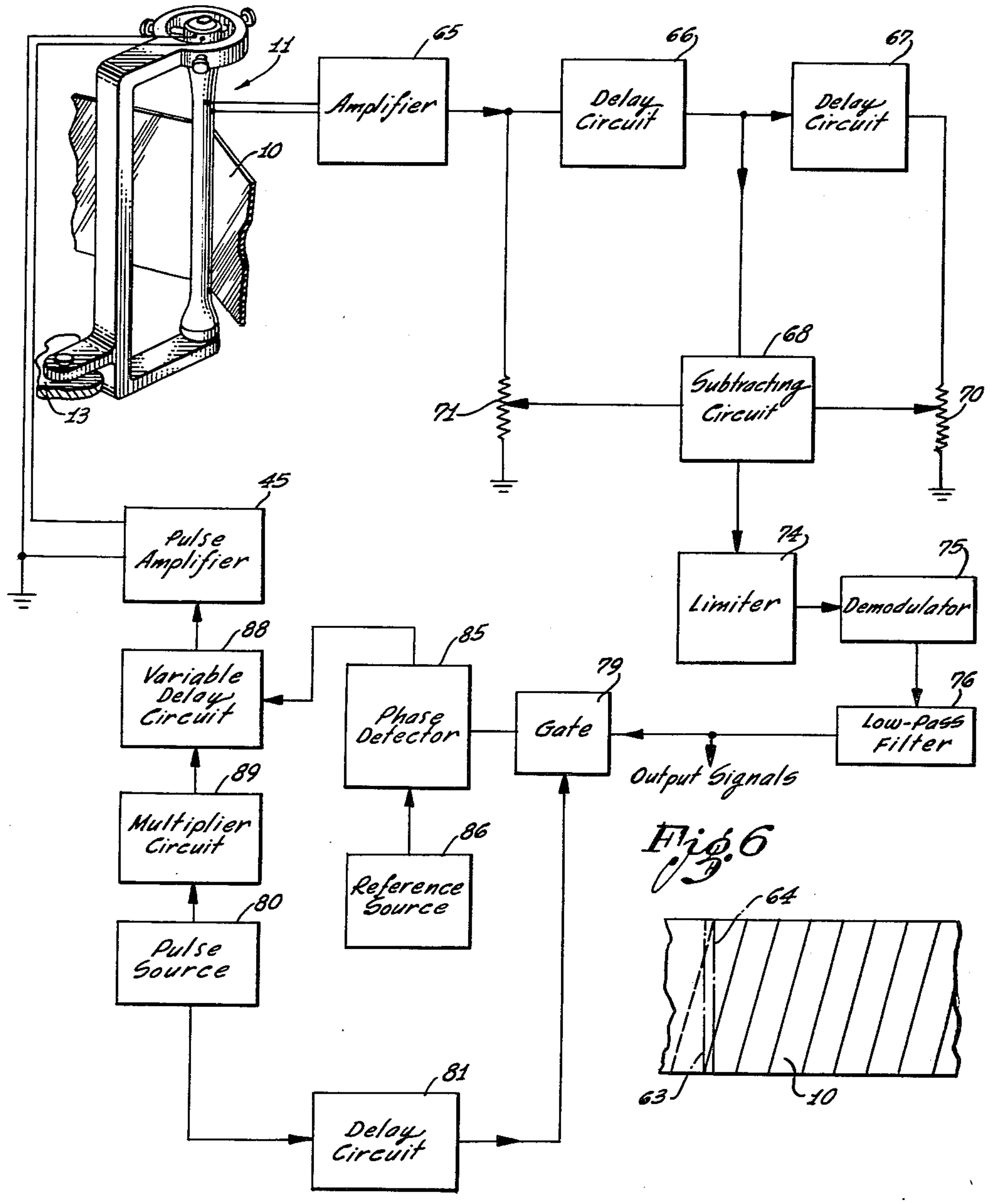

FIGURE 5 is a circuit representation of the cross-talk reducing system of this invention including a perspective view of the transducer head and magnetic tape; and FIGURE 6 is a diagrammatic representation of a section of the magnetic tape illustrating on an exaggerated scale the relative positions of successive transverse tracks with respect to the instantaneous position of the recording gap formed therealong by successive elastic waves.

The cross-talk reducing system of this invention, which is shown in FIGURE 5 compensates for any cross-talk introduced by recording and reproducing color television chrominance or the like signals. The system includes a traveling wave transducer head 11 which is briefly hereafter described in reference to FIGURES 2, 3 and 4, and which is described in detail in my copending application Serial No. 733,165 filed on May 5, 1958.

Figure 1:
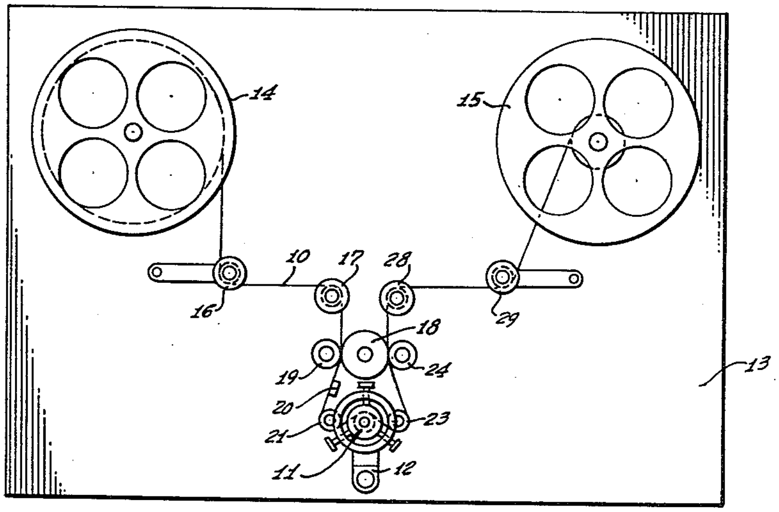
FIGURE 1 is a schematic diagram of equipment for progressing the magnetic tape adjacent the traveling wave transducer head.

The tubular shaped transducer head 11 is supported by an adjustable bracket 12 which is rigidly secured to a panel 13 on which tape transport equipment, shown in FIGURE 1, is mounted. Referring to FIGURE 1, the tape transport equipment for progressing a magnetic tape 10 adjacent to the transducer head 11 is shown in highly diagrammatic form. The transducer head 11 records and reproduces information on successive transverse tracks across the magnetic tape 10. The magnetic tape 10 is driven from a pay-out reel 14 adjacent the transducer head 11 and rewound on a take-up reel 15. The magnetic tape 10 may be tensioned by individual motors, not shown, which drive the pay-out reel 12 and the take-up reel 13.

From the pay-out reel 12, the magnetic tape 10 passes over a spring actuated tensioning arm 16 about which it turns at substantially a right angle to pass over a guide post or roller 17. At the roller 17, the magnetic tape 10 again makes a right angle turn to pass between a drive capstan 18 and a rubber nip-roller 19 and then against a cleaning device 20 to another guide post or the roller 21. The roller 21 directs the magnetic tape 10 over the transducer head 11 at a predetermined angle from the transducer head 11. The magnetic tape 10 passes along a path from the head 11 to the reel 15 that is substantially the image of the path from the reel 14 to the head 11. The path from the transducer head 11 is over a roller 23 between the nip-roller and the drive capstan 18, roller 28 and spring actuated tension arm 29 to the take-up reel 15. The drive, therefore, for the magnetic tape 10 is a tight loop drive wherein the speed of the magnetic tape 10 relates only to the peripheral speed of the drive capstan 18.

Figures 2, 3:
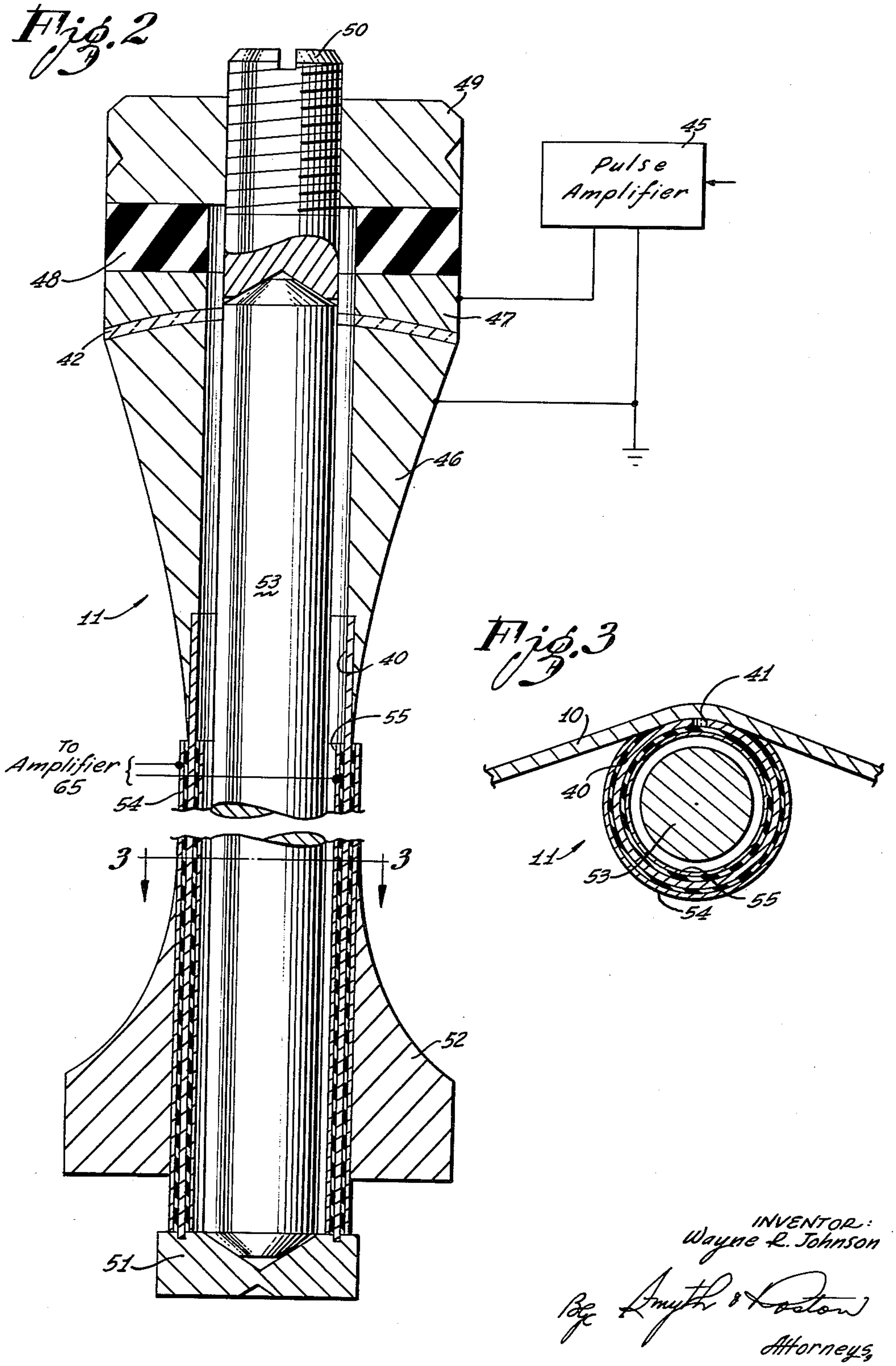
FIGURE 2 is a longitudinal sectional view of the transducer head utilized in the cross-talk reducing system of this invention.
FIGURE 3 is a sectional view of the transducer head taken through line 3—3 of FIGURE 2.

The transducer head 11 is shown particularly in FIGURES 2 and 3 and includes a tube 40 of magnetostrictive material which changes its magnetic properties with stress.

The magnetostrictve tube 40 which may be made of "Permalloy" tape has a non-magnetic gap 41 extending longitudinally along the tube 40. Elastic waves are transmitted longitudinally through the magnetostrictive tube 40 by a piezoelectric crystal 42 responsive to voltage pulses developed by a pulse amplifier 45. The pulses developed by the amplifier 45 are 0.1 microsecond in duration and have an adjustable repetition period which is slightly less than is required to transmit an elastic wave or acoustic pulse through the magnetostrictive tube 40.

At one end of the magnetostrictive tube 40, an acoustic transformer section 46 is mounted to couple acoustic waves generated by the piezoelectric crystal 42 to the magnetostrictive tube 40. The other side of the crystal 42 is attached to an annulus 47 which functions as a buttress against which the crystal 42 acts to deliver pulsed energy developed thereby to the acoustic transformer section 46. The annulus 47 is in turn backed by an annulus 48 of insulating material which is a good absorber of sound. The absorbent annulus 48 is in turn secured to a metal cap or nut 47 which is internally threaded to receive an adjusting screw 50.

At the opposite end of the magnetostrictive tube 40, a cap 51 and an acoustic absorbant section 52 is mounted. The waves generated from the crystal 42 are transmitted or propagated through the acoustic transformer section 46 and the magnetostrictive tube 40 to the absorbing section 52. The structure including the magnetostrictive tube 40 is placed in tension by means of a strut 53 extending longitudinally through the tube 40 and bearing at one end in a depression formed in the inner end of the adjusting screw 50 and at the other end in a similar depression in the cap 51.

Figure 4:
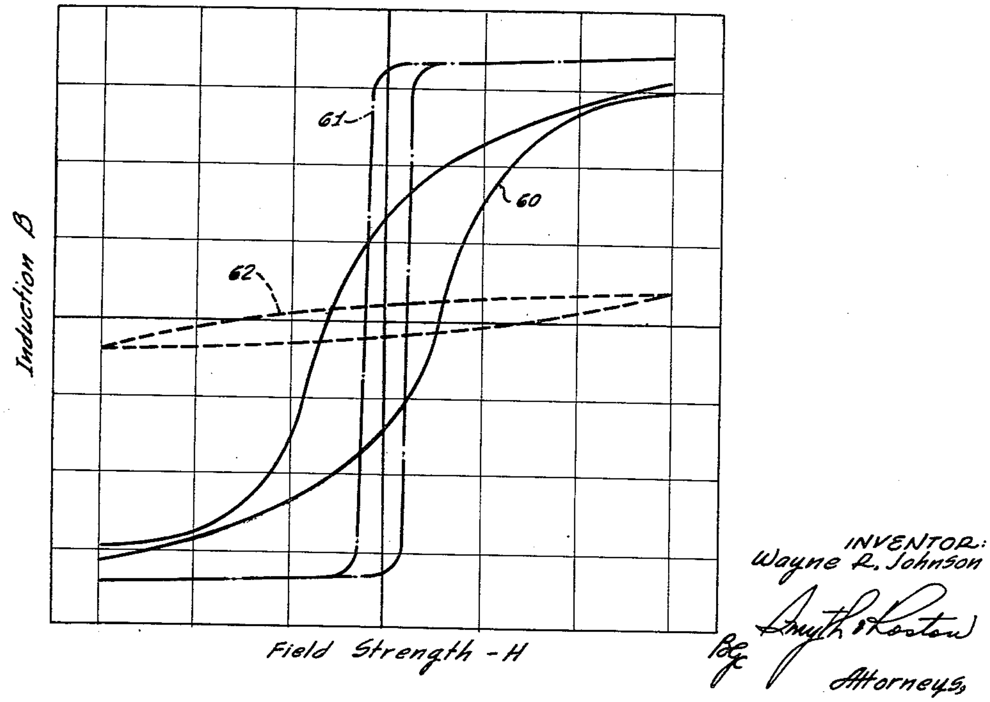
FIGURE 4 is a series of curves illustrating the magnetic properties of the magnetostrictive tube material under tension and as affected by an elastic wave.

The effect of the stresses applied to the magnetostrictive tube 41 due to the acoustic waves from the piezoelectric crystal 42 is illustrated in FIGURE 4. In FIGURE 4, the hysteresis loop 60 is that of the unstressed tube 40 and the slope of the loop represents its permeability. When the tube 40 is stressed longitudinally due to the effect of the nut 49 on the adjusting screw 50, the shape of the hysteresis loop is changed materially to that of the hysteresis loop 61. The hysteresis loop 61 is nearly rectangular in form and has a very steep slope almost to saturation. Circumferentially, however, the effect of the tension causes the slope of the hysteresis loop or the permeability to approach zero as indicated by curve 62. In other words, the magnetostrictive tube 40 acts as though it were non-magnetic to circumferential fields. Circumferential fields are induced by a signal winding including the plating sections 54 and 55, which are plated on the exterior and interior respectively of the magnetostrictive tube 40.

A relaxation of the stress in the tube 40 causes the permeability to change back towards its normal condition as indicated by the curve 61. The acoustic waves or elastic pulses, which are produced by the piezoelectric crystal, sequentially change the permeability of successive positions of the tube 40 along the wave due to the momentary relaxation of the stress. In this manner, the acoustic wave changes the condition of successive positions along the tube 40 from being effectively non-magnetic to being effectively magnetic. When the wave passes, the portions return to their normal effectively non-magnetic condition determined by the applied stresses.

During the time that an acoustic wave is transmitted longitudinally through the magnetostrictive tube 40, a signal current applied to the plated windings 55 and 54 is effectively recorded on the magnetic tape 10 which is positioned against the gap 41 in the tube 40. As the tape 10 is progressed along its longitudinal axis adjacent to the magnetostrictive tube 40 of the transducing head 11, the successive acoustic waves through the tube 40 cause the signals introduced to the windings 54 and 55 to be recorded as successive transverse tracks on the magnetic tape 10.

In FIGURE 6, the virtual recording gap of the head 11 towards the termination of one transverse track is indicated at 63 and at the beginning of the next transverse track at 64. The spacing of the two gaps 63 and 64 indicates that some of the information at the end of one track is also recorded at the beginning of the next track as one acoustic wave is initiated before its preceding wave has completely traversed the magnetostrictive tube 40.

When the magnetic tape 10 is moved adjacent to the head 11 in the manner described above and illustrated in FIGURES 1 and 5, any change of longitudinal speed or any transverse movement of the tape increasing the skew will tend to increase cross-talk. These changes in speed and movement also cause the signals being recorded or reproduced to become modulated in phase. The signals recorded on the tape 10 as indicated above may be color television signals which are frequency modulated on a carrier.

FIGURE 5 illustrates a reproducing system which reproduces cross-talk by subtracting echos or signals derived from adjacent tracks and by compensating the phase modulation to adjust the coordination between tape movements and the elastic waves in the head. As shown in FIGURE 5, the reproduced chrominance signals from the transducer head 11 are coupled through a wide band amplifier 65 to a delay circuit or line 66. The delay circuit 66 provides for a delay of 10.55 microseconds which corresponds to the transit time for reproducing the information in one transverse track on the magnetic tape 10. The delay provided by the circuit 66, therefore, is equal to the time for an acoustic wave to pass through the magnetostrictive tube 40 from one edge of the tape 10 to the other. The acoustic waves traverse the magnetostrictive tube 40 at a relatively high speed of approximately 15,750 feet per second which, in terms of the line frequency utilized in television transmission, is about 1 foot per picture line or six transverse tracks across the magnetic tape 10 for each line of the television picture. The delayed chrominance signals from the circuit 66 are supplied to a subtracting circuit 68 and also to another delay circuit 67 which is similar to the delay circuit 66. The subtracting circuit 68 functions to subtract two signals from the delayed signals from the circuit 66. One of the subtracted signals is obtained from the delay circuit 67 through the potentiometer 70; and the other of the subtracted signals is obtained from the amplifier 65 through a potentiometer 71. The potentiometers 70 and 71 function respectively to provide signals having magnitudes which are a fraction of the magnitudes of the signals thereto. The attenuated signals, which may be 10 decibels below the signals from the amplifier 65 and delay circuit 67, are subtracted from the signal from the circuit 66. In this manner, the signals which are delayed by the transit time for reproducing one track have continuously subtracted therefrom at reduced magnitudes signals which are delayed by the transit time for reproducing two tracks and signals which are not delayed at all.

The reason for subtracting these signals from the signals produced by the delay circuit 66 is to reduce cross-talk between adjacent transverse tracks on the tape 10. As indicated above, cross-talk occurs when the transducer head 11 reproduces some of the signals from adjacent tracks as well as the signals from the track it is reproducing. A condition of this type occurs, for example, when the recording levels are excessive or when the recording tape speed is relatively slow so that the transverse tracks are close. A condition of this type also occurs when the acoustic wave is transmitted along one edge of a transverse track or between two transverse tracks during the reproducing sequence. Any lack of coordination between the passage of the acoustic waves and the transverse tracks during either recording or reproducing generally results in cross-talk. Moreover, any angular variation in the position of the tape 10 relative to the transducer head 11 which is often referred to as skew, tends to provide for cross-talk. Cross-talk, therefore, in general, occurs because the tracks are too close or too wide or because the acoustic waves does not traverse the magnetostrictive tube 40 along the center line of a transverse track but transverses it, displaced therefrom or at a slight angle therewith, depending upon the relative timing of the pulses with respect to the movement of the tape or upon the skew of the tape. The cross-talk, or signals from adjacent tracks appears as noise in the reproduced signals which distort the chrominance signals. By continuously subtracting an attenuated signals derived from the preceding and following transverse tracks, most of the cross-talk is eliminated. The potentiometers 70 and 71 are set to provide signal magnitudes approximating the average magnitude of the cross-talk from the adjacent tracks.

The resulting signals from the subtracting circuit 68 with the cross-talk appreciably reduced are supplied to a limiter 74 which removes any amplitude modulation of the frequency modulated signals. From the limiter 74, the frequency modulated signals are supplied to a demodulator 75 which separates the video chrominance signals from the 10 megacycle carrier. The demodulated chrominance signals are supplied from the demodulator 75 through a low pass filter 76 which attenuates frequencies over four megacycles.

The chrominance or output signals are supplied to a gate which is periodically enabled by pulses from a pulse source 80. The source 80 has a repetition rate of 15,750 pulses per second which, as indicated above, is the television line frequency. The enabling pulses from the source 80 are delayed by a delay circuit 81 for an interval equal to the transit time for reproducing the information from one transverse track of the tape so they are delayed by an interval equal to the delay interval of the video chrominance signals to the gate 79 due to the delay circuit 66.

The chrominance signals include a color burst frequency or signal of approximately 3.58 megacycles followed by information signals, with the information being indicated by the instantaneous phase displacement between the information signals and the bursts of reference frequency. The color burst frequency occurs once at the beginning of each horizontal scanning line or at a frequency of 15,750 cycles per second. The enabling pulses from the delay circuit 81 to the AND gate 79 are timed to coincide with the bursts of reference frequency. The gate 79 remains enabled for the duration of the bursts of reference frequency but becomes disabled at the termination of the enabling pulse before the information signals following the bursts of reference frequency are received at the gate 79.

The phase of the burst of reference frequency is compared in the phase detector 85 with the phase of a signal from the source 86. The signal from the source 86 is a 3.58 megacycle signal which is the nominal frequency of the burst of reference frequency. The phase detector or comparator 85 provides a varying direct-current error signal having a magnitude and polarity related to the magnitude and direction of the phase deviation between the burst of reference frequency and signal from the source 86.

The error signal from the indicator 85 is supplied to a variable delay circuit 88 which is part of a control path from the pulse source 80 to the transducer head 11. The pulse source 80 supplies the horizontal drive pulses at a frequency 15,750 cycles to a multiplier circuit 89 which multiplies the repetition rate of the pulses from a source 80 by a factor of 6 so that pulses at a frequency of 94.5 kilocycles are supplied to the variable delay circuit 88. The pulses from the source 80 are multiplied by a factor of six because, as described above, six transverse tracks on the tape 10 are utilized to record one horizontal line of the television picture. The pulses from the delay circuit 88 at a frequency of 94.5 kilocycles are supplied to the pulse amplifier 45 which, as described above, successively excites the piezoelectric crystal 42 of the transducer head 11.

If the movement of the tape 10 adjacent the transducer head 11 causes the phase deviation to be leading, the error signal from the detector 85 causes the circuit 88 to increase the delay of the pulses to the amplifier 45. Conversely, a lagging deviation provides for a smaller delay. An increased delay reduces the repetition rate of the six succeeding pulses because the circuit 88 remains set until the next burst of reference frequency is compared in the detector 85. A reduced delay increases the repetition rate of the next six pulses. In this manner, the pulse repetition rate for exciting acoustic waves is adjusted for the five elastic waves corresponding to the five information transverse tracks which follow the track in which the burst of reference frequency is recorded. The phase of the next burst of reference frequency is also adjusted but this does not change the color information because its phase deviation is thereafter compensated. In other words, the initiating of the five acoustic waves following the first acoustic wave for reproducing a horizontal line of a television picture are delayed when the error signal indicates a leading phase deviation. The instantaneous phase displacement between the information signal of the chrominance signal and the burst of reference frequency is, therefore, adjusted in accordance with the phase deviation of the burst of reference frequency which, as indicated above, relates to the changes in speed and movements of the magnetic tape adjacent the transducer head 11 for both recording and reproducing.

By adjusting the phase of the signals in this manner, any variation in coordination which causes the elastic wave not to pass adjacent the center line of a transverse track is compensated. When the phase deviation is leading due, for example, to a slight increase of longitudinal tape speed, the elastic waves pass adjacent the tracks slightly off center towards the following track. When the phase deviation is leading, therefore, cross-talk from the following or next succeeding track may be increased. The cross-talk is automatically reduced by subtracting an attenuated signal derived from the succeeding track and also by detecting the phase deviation due to the change in speed and for adjusting the coordination of the elastic waves in accordance therewith to recenter them adjacent the centerlines of the transverse tracks.

Although this application has been disclosed and illustrated with reference to particular applications, the principles involved are susceptible of numerous other applications which will be apparent to persons skilled in the art. For example, the various mentioned frequencies and repetition rates are merely illustrative. The invention is, therefore, to be limited only as indicated by the scope of the appended claims.

I claim:

1. A system for eliminating cross-talk between signals recorded in adjacent transverse tracks on a medium by transverse recording and reproducing equipment including, a first delay circuit coupled to the recording and reproducing equipment for delaying reproduced signals for an interval equal to the reproduction time of the signals in one transverse track of the medium, and means coupled to said recording and reproducing equipment and to said delay circuit for subtracting a portion of the magnitudes of the reproduced signals from said equipment from the delayed signals from said delay circuit.

2. A system for eliminating cross-talk between signals recorded in adjacent transverse tracks on a medium by transverse recording and reproducing equipment including, a first delay circuit coupled to the recording and reproducing equipment for delaying reproduced signals for an interval equal to the reproduction time of the signals in one transverse track of the medium, a second delay circuit coupled to said first delay circuit for additionally delaying the delayed signals from said first delay circuit for an interval equal to the reproduction time of the signals in one transverse track of the medium, and means coupled to said recording and reproducing equipment and to said first and second delay circuits for subtracting a portion of the reproduced signals from the equipment and a portion of the additionally delayed signals from said second delay circuit from the delayed signals from said first delay circuit.

3. A system for eliminating cross-talk between signals recorded in adjacent transverse tracks on a medium by transverse recording and reproducing equipment including, a first delay circuit coupled to the recording and reproducing equipment for delaying reproduced signals for an interval equal to the reproduction time of the signals in one transverse track of the medium, a second delay circuit coupled to said first delay circuit for additionally delaying the delayed signals from said first delay circuit for an interval equal to the reproduction time of the signals in one transverse track of the medium, and means coupled to said first and second delay circuits for subtracting a portion of the additionally delayed signals from said second delay circuit from said delayed signals from said first delay circuit.

4. In a transverse reproducing system in which successive transverse tracks on a magnetic tape are progressed adjacent a transducer head extending transversely across the tape, means coupled to the transducer head for delaying the reproduced signals from the transducer head by an interval equal to the time for reproducing the signals recorded in one transverse track of the tape, means coupled to the transducer head for attenuating the reproduced signals, and means coupled to said attenuating means and to said delaying means for continuously subtracting the attenuated signals from said attenuating means from the delayed signals from said delaying means.

5. In a transverse reproducing system in which successive transverse tracks on a magnetic tape are progressed adjacent a transducer head extending transversely across the tape, means coupled to the transducer head for delaying the reproduced signals from the transducer head by an interval equal to the time for reproducing the signals recorded in one transverse track of the tape, means coupled to the transducer head for attenuating the reproduced signals, means coupled to said attenuating means and to said delaying means for continuously subtracting the attenuated signals from said attenuating means from the delayed signals from said delaying means, a reference source of signals, means coupled to said delaying means and to said source for determining the deviation in phase of said delayed signals from the phase of said reference signals, and means coupled to said determining means for adjusting the repetition rate of reproducing signals recorded in successive transverse tracks on the magnetic tape.

6. In a reproducing system in which information in the form of the instantaneous phase displacement between information signals and reference signals is recorded on successive transverse tracks on a recording medium progressed adjacent a sensing member, means coupled to the sensing member for delaying reproduced signals from the sensing member for a time interval equal to the time for reproducing the signals recorded in one transverse track of the recording medium, means coupled to said sensing member for attenuating reproduced signals from said sensing means, means coupled to said attenuating means and to said delaying means for continuously subtracting attenuated signals from said attenuating means from the delayed signals from said delaying means, a reference source of oscillations, means coupled to said delaying means and to said source for determining the deviation in phase of the delayed reference signals from said delaying means and the oscillations from said source, and means coupled to said determining means for adjusting the repetition rate for reproducing the information signals recorded on successive transverse tracks following the transverse track on which the reference signals are recorded whereby the coordination between tape movement and the repetition rate for reproducing signals is adjusted.

7. A system for eliminating cross-talk between signals recorded in adjacent transverse tracks on a medium by transverse recording and reproducing equipment, including, a first delay circuit coupled to the recording and reproducing equipment for delaying reproduced signals for an interval equal to the reproduction time of the signals in one transverse track of the medium, a second delay circuit coupled to said first delay circuit for additionally delaying the delayed signals from said first delay circuit for an interval equal to the reproduction time of the signals in one transverse track of the medium, first attenuating circuit means coupled to said recording and reproducing equipment for providing a reduced amplitude signal derived from the reproduced signals, second attenuating means coupled to said second delay circuit for providing reduced amplitude signals of the additionally delayed signals from said second delay circuit, and means coupled to said first and said second attenuating means and to said first delay circuit for continuously subtracting said reduced amplitude signals from both said first and said second attenuating means from said delayed signals from said second delay circuit.

8. A system for eliminating cross-talk between signals recorded in adjacent transverse tracks on a medium by transverse recording and reproducing equipment, including, a first delay circuit coupled to the recording and reproducing equipment for delaying reproduced signals for an interval equal to the reproduction time of the signals in one transverse track of the medium, a second delay circuit coupled to said first delay circuit for additionally delaying the delayed signals from said first delay circuit for an interval equal to the reproduction time of the signals in one transverse track of the medium, first attenuating circuit means coupled to said recording and reproducing equipment for providing a reduced amplitude signal derived from the reproduced signals, second attenuating means coupled to said second delay circuit for providing reduced amplitude signals of the additionally delayed signals from said second delay circuit, means coupled to said first and said second attenuating means and to said first delay circuit for continuously subtracting said reduced amplitude signals from both said first and said second attenuating means from said delayed signals from said second delay circuit, a source of reference signals, means coupled to said source and to said subtracting means for generating an error signal having a magnitude and polarity determined by the magnitude and direction of the phase deviation between some of said signals from said subtracting means and the reference signals from said source, and means coupled to said generating means for introducing said error signal to the recording and reproducing equipment for adjusting the repetition rate for reproducing signals recorded on the transverse tracks of the medium.

9. In a reproducing system for reducing cross-talk between adjacent signal channels on a recording medium, including, means for successively reproducing signals recorded on the channels of the recording medium, means coupled to said reproducing means for storing the reproduced signal for a particular interval, means coupled to said storing means for subtracting signals derived from channels adjacent to the channel for which signals are stored by said storing means from said signals being stored by said storing means, means coupled to said subtracting means for recognizing variations in the signal from said subtracting means, and means coupled to said recognizing means for adjusting the rate for successively reproducing the signals on said channels by said reproducing means in accordance with the recognized variations in the signal from said subtracting means.

10. In a reproducing system for reducing cross-talk between adjacent signals in progressive channels on a recording medium movable in a first direction, means coupled to the recording medium for reproducing the signals recorded in the progressive signal channels during the movement of the medium in the first direction, means coupled to said reproducing means for delaying the reproduced signals for a particular interval corresponding to the time between the reproduction of the adjacent signals in the progressive channels, and means coupled to said reproducing means and to said delaying means for continuously subtracting predetermined reduced magnitudes of the reproduced signals from said reproducing means from the delayed signals from said delaying means.

11. In a reproducing system for reducing cross-talk between adjacent signals in progressive channels on a recording medium movable in a first direction, including, means for successively reproducing signals recorded on the progressive channels of the recording medium during the movement of the medium in the first direction, means coupled to said reproducing means for storing the reproduced signals for a particular interval corresponding to the time between the reproduction of the adjacent signals in the progressive channels, means for providing only a particular portion of the signals reproduced in each channel, and means coupled to said storing means and the reproducing means for subtracting the particular portion of the signals derived from each channel from said signals stored by said storing means from the preceding channel in the first direction.

12. In a reproducing system for reducing cross-talk between different signals in progressive channels on a recording medium movable in a first direction, including, means for successively reproducing signals recorded in the progressive channels of the recording medium during the movement of the medium in the first direction, means coupled to said reproducing means for storing the reproduced signals for a particular interval corresponding to the time between the reproduction of the adjacent signals in the progressive channels, and means coupled to said storing means for subtracting signals derived from the adjacent channels in the first direction from said signals stored by said storing means.

13. The combination set forth in claim 11 in which means are operatively coupled to the reproducing means for producing only a particular portion of such signals and in which the subtracting means subtracts the particular portion of the reproduced signals from the signals stored by the storing means for the adjacent channels.

References Cited in the file of this patent

UNITED STATES PATENTS

| | | |
|---|---|---|
| 2,531,642 | Potter | Nov. 28, 1950 |
| 2,682,615 | Sziklai | June 29, 1954 |
| 2,689,274 | Saeger | Sept. 14, 1954 |
| 2,762,861 | Somers | Sept. 11, 1956 |
| 2,795,643 | Lockhart | June 11, 1957 |
| 2,842,756 | Johnson | July 8, 1958 |
| 2,842,761 | Downs | July 8, 1958 |
| 2,866,012 | Ginsburg et al. | Dec. 23, 1958 |
| 2,896,192 | Husman | July 21, 1959 |